(12) United States Patent
Ryu (10) Patent No.: US 11,518,236 B2
(45) Date of Patent: Dec. 6, 2022

(54) DEVICE FOR REINFORCING VEHICLE FUEL TANK

(71) Applicants: HYUNDAI MOTOR COMPANY, Seoul (KR); KIA MOTORS CORPORATION, Seoul (KR)

(72) Inventor: Bu Yeol Ryu, Hwaseong-si (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 109 days.

(21) Appl. No.: 17/078,963

(22) Filed: Oct. 23, 2020

(65) Prior Publication Data

US 2021/0138894 A1    May 13, 2021

(30) Foreign Application Priority Data

Nov. 7, 2019  (KR) .................... 10-2019-0141622

(51) Int. Cl.
| | | |
|---|---|---|
| *B65D 6/34* | (2006.01) | |
| *B60K 15/03* | (2006.01) | |
| *B60K 28/14* | (2006.01) | |
| *B60K 15/073* | (2006.01) | |
| *B60K 15/067* | (2006.01) | |

(52) U.S. Cl.
CPC .......... *B60K 15/03* (2013.01); *B60K 15/073* (2013.01); *B60K 28/14* (2013.01); *B65D 11/22* (2013.01); *B60K 2015/03453* (2013.01); *B60K 2015/0675* (2013.01)

(58) Field of Classification Search
CPC .......... B60K 15/03; B60K 2015/03493; B60K 2015/0675; B60K 15/073; B65D 11/22; B65D 11/26

See application file for complete search history.

(56) References Cited

U.S. PATENT DOCUMENTS

| | | |
|---|---|---|
| 9,027,781 B2 | 5/2015 | Criel et al. |
| 9,168,830 B2 | 10/2015 | Park |
| 9,649,929 B2 | 5/2017 | Hill et al. |
| 9,731,866 B2 | 8/2017 | Quant et al. |
| 9,919,595 B2 | 3/2018 | Diestelhorst et al. |
| 10,011,068 B2 | 7/2018 | Egger et al. |
| 2016/0214477 A1 | 7/2016 | Boecker et al. |
| 2018/0134150 A1 | 5/2018 | Matsuzaki |
| 2018/0154769 A1* | 6/2018 | Lee .................. B60K 15/03 |

FOREIGN PATENT DOCUMENTS

| | | |
|---|---|---|
| EP | 2242663 B1 | 9/2012 |
| JP | 5040875 B2 | 10/2012 |
| KR | 10-1714002 B1 | 3/2017 |
| KR | 10-2018-0064675 A | 6/2018 |

* cited by examiner

*Primary Examiner* — Stephen J Castellano
(74) *Attorney, Agent, or Firm* — Lempia Summerfield Katz LLC (57) ABSTRACT

A device for reinforcing vehicle fuel tank improves a structure of a rigid reinforcement pillar mounted in an enclosed fuel tank by maintaining stiffness of the reinforcement pillar in a state in which the fuel tank is under positive pressure and an engine negative pressure acts thereon as well as inducing breakage of the reinforcement pillar when a large impact applies, such as in the event of vehicle collision, thereby preventing a fused portion between upper and lower plates of the fuel tank from rupturing.

20 Claims, 8 Drawing Sheets

DEVICE FOR REINFORCING VEHICLE FUEL TANK

CROSS-REFERENCE TO RELATED APPLICATION

This application claims priority to and the benefit of Korean Patent Application No. 10-2019-0141622, filed on Nov. 7, 2019, the entire contents of which are incorporated herein by reference.

FIELD

The present disclosure relates to a device for reinforcing vehicle fuel tank. More particularly, it relates to a device for reinforcing vehicle fuel tank, capable of improving robustness of a fuel tank under positive and negative pressure therein while preventing a rupture of the fuel tank which causes a leakage of oil in the event of collision.

BACKGROUND

The statements in this section merely provide background information related to the present disclosure and may not constitute prior art.

In general, it is possible to meet regulations on emission of evaporation gas in a gasoline vehicle, since when an engine negative pressure acts on a fuel tank through a canister while an engine is driving, the evaporation gas in the fuel tank is collected in the canister and the evaporation gas collected in the canister enters the combustion chamber of the engine by the engine negative pressure to burn therein.

On the other hand, the evaporation gas in a fuel tank may not be properly collected in a canister in a hybrid vehicle, since an engine negative pressure due to the operation of an engine is unusable when only a drive motor is operated.

In order to solve this issue, the fuel tank of the hybrid vehicle is manufactured in an enclosed structure using a plastic material.

However, if the internal pressure of the fuel tank is increased due to an increase in outside air temperature, the fuel tank made of a plastic material may be deformed.

Accordingly, a rigid reinforcement member is installed in the fuel tank to prevent the deformation of the fuel tank.

Figure 1:
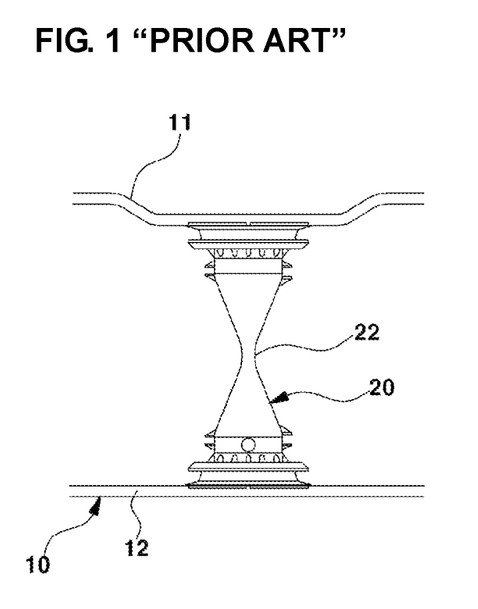
FIG. 1 is a cross-sectional view illustrating an example of an existing rigid reinforcement member installed in a fuel tank.

FIG. 1 illustrates an example of an existing rigid reinforcement member installed in a fuel tank.

As illustrated in FIG. 1, a reinforcement pillar 20 is connected between an upper plate 11 and a lower plate 12 of a fuel tank 10.

That is, the upper and lower surfaces of the reinforcement pillar 20 are integrally fused to the respective upper and lower plates 11 and 12 of the fuel tank 10 by thermal fusion or the like.

Particularly, in view of the fact that the reinforcement pillar 20 has to be manufactured in a structure in which it is able to break for absorption of an impact in the event of vehicle collision in accordance with safety regulations, a concave breakable part 22 is formed in the intermediate portion of the reinforcement pillar 20.

Therefore, when a large impact, such as an impact in the event of vehicle collision, is applied to the plastic-made fuel tank 10 made of a plastic material, the fuel tank 10 is deformed to absorb the impact while the breakable part 22 of the reinforcement pillar 20 is broken to absorb the impact.

However, we have discovered that if the stiffness of the reinforcement pillar 20 is greater than necessary, the breakable part 22 is not broken, and instead a fused portion between the upper plate 11 of the fuel tank 10 and the upper surface of the reinforcement pillar 20 or other fused portion between the lower plate 12 of the fuel tank 10 and the lower surface of the reinforcement pillar 20 is ruptured (torn), when a large impact, such as in the event of vehicle collision, is applied to the plastic-made fuel tank 10 made of plastic, which leads to a leakage of fuel in the fuel tank.

On the other hand, if the stiffness of the reinforcement pillar 20 is too weak, the breakable part 22 is easily broken by only negative pressure acting in the fuel tank, resulting in excessive deformation of the fuel tank.

The above information disclosed in this Background section is only for enhancement of understanding of the background of the disclosure and therefore it may contain information that does not form the prior art that is already known to a person of ordinary skill in the art.

SUMMARY

In an aspect, the present disclosure provides a device for reinforcing vehicle fuel tank, capable of improving a structure of a rigid reinforcement pillar mounted in an enclosed fuel tank by maintaining stiffness of the reinforcement pillar in a state in which the fuel tank is under positive pressure and an engine negative pressure acts thereon as well as inducing breakage of the reinforcement pillar by a large impact, such as in the event of vehicle collision, applied thereto, thereby preventing a fused portion between upper and lower plates of the fuel tank from rupturing.

In one form of the present disclosure, a device for reinforcing vehicle fuel tank may include: a reinforcement pillar that includes an upper portion forming an upper opening, and a lower portion forming a lower opening, upper fastening legs provided at both positions above the upper opening, and lower fastening legs provided at both positions beneath the lower opening; an upper fusion structure having an upper coupling protrusion on its outer peripheral surface, where an upper surface of the upper fusion structure is fused to an inner surface of an upper plate of a fuel tank in a state in which a lower portion of the upper fusion structure is inserted into the upper opening and the upper coupling protrusion is latched and fastened to the upper fastening legs; a lower fusion structure having a lower coupling protrusion on its outer peripheral surface, where a lower surface of the lower fusion structure is fused to an inner surface of a lower plate of the fuel tank in a state in which an upper portion of the lower fusion structure is inserted into the lower opening and the lower coupling protrusion is latched and fastened to the lower fastening legs; and at least one breakable part formed in the reinforcement pillar to induce breakage of the reinforcement pillar when an impact, which is equal to or more than a threshold impact value, is applied thereto.

The reinforcement pillar may have upper leg supports formed on an outer peripheral surface of the upper opening to support the upper fastening legs, and lower leg supports formed on an outer peripheral surface of the lower opening to support the lower fastening legs.

In one form, upper breaking ribs may be formed integrally with the upper fastening legs and the upper leg supports and disposed between the upper fastening legs and the upper leg supports, and the upper breaking ribs may be broken by a tensile force, which is equal to or more than a threshold tensile force value, applied through the upper coupling protrusion. In another form, lower breaking ribs may be formed integrally with the lower fastening legs and the lower leg supports and disposed between the lower fastening legs and the lower leg supports, and the lower breaking ribs may be broken by a tensile force, which is equal to or more than a threshold tensile force value, applied through the lower coupling protrusion.

The at least one breakable part may include one or more breakable parts between the upper leg supports and the lower leg supports, and the breakable parts may be broken by a compressive force, which is equal to or more than a threshold compressive force value, applied in the event of vehicle collision.

Each of the breakable parts may be a groove formed at a portion of the reinforcement pillar where the reinforcement pillar is reduced in radial thickness. The groove may be recessed on either an inner or outer surface of the reinforcement pillar. Alternatively, the groove may be recessed on both inner and outer surfaces of the reinforcement pillar.

In another form, the upper fastening legs may be inclined diagonally above the upper opening, upper portions of the upper fastening legs may be connected to the upper leg supports through the upper breaking ribs, lower portions of the upper fastening legs may be positioned at a predetermined distance above an upper end of the upper opening, and the upper coupling protrusion may be inserted and positioned between the lower portions of the upper fastening legs and the upper end of the upper opening.

In some forms, the lower fastening legs may be inclined diagonally beneath the lower opening, lower portions of the lower fastening legs may be connected to the lower leg supports through the lower breaking ribs, upper portions of the lower fastening legs may be positioned at a predetermined distance beneath a lower end of the lower opening, and the lower coupling protrusion may be inserted and positioned between the upper portions of the lower fastening legs and the lower end of the lower opening.

In some forms, the upper fastening legs disposed at both positions above the upper opening may be integrally formed on a lower surface of an upper support rib having a ring shape, and the lower fastening legs disposed at both positions beneath the lower opening may be integrally formed on an upper surface of a lower support rib having a ring shape. The upper and lower support ribs may extend in an elliptical shape.

In other form, the upper fusion structure may be provided, at its upper end, with an upper fusion plate having a plurality of fusion protrusions for fusion with the upper plate of the fuel tank, and the lower fusion structure may be provided, at its lower end, with a lower fusion plate having plurality of fusion protrusions for fusion with the lower plate of the fuel tank.

Other aspects and exemplary forms of the disclosure are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

It should be understood that the appended drawings are not necessarily to scale, presenting a somewhat simplified representation of various features illustrative of the basic principles of the disclosure. The specific design features of the present disclosure as disclosed herein, including, for example, specific dimensions, orientations, locations, and shapes will be determined in part by the particular intended application and use environment.

Hereinafter reference will now be made in detail to various forms of the present disclosure, examples of which are illustrated in the accompanying drawings and described below. While the disclosure will be described in conjunction with exemplary forms, it will be understood that present description is not intended to limit the disclosure to those exemplary forms. On the contrary, the disclosure is intended to cover not only the exemplary forms, but also various alternatives, modifications, equivalents and other forms, which may be included within the spirit and scope of the disclosure as defined by the appended claims.

FIGS. 2 to 8 illustrate a device for reinforcing vehicle fuel tank according to some forms of the present disclosure, in which reference numeral 100 designates a reinforcement pillar.

Figure 2:
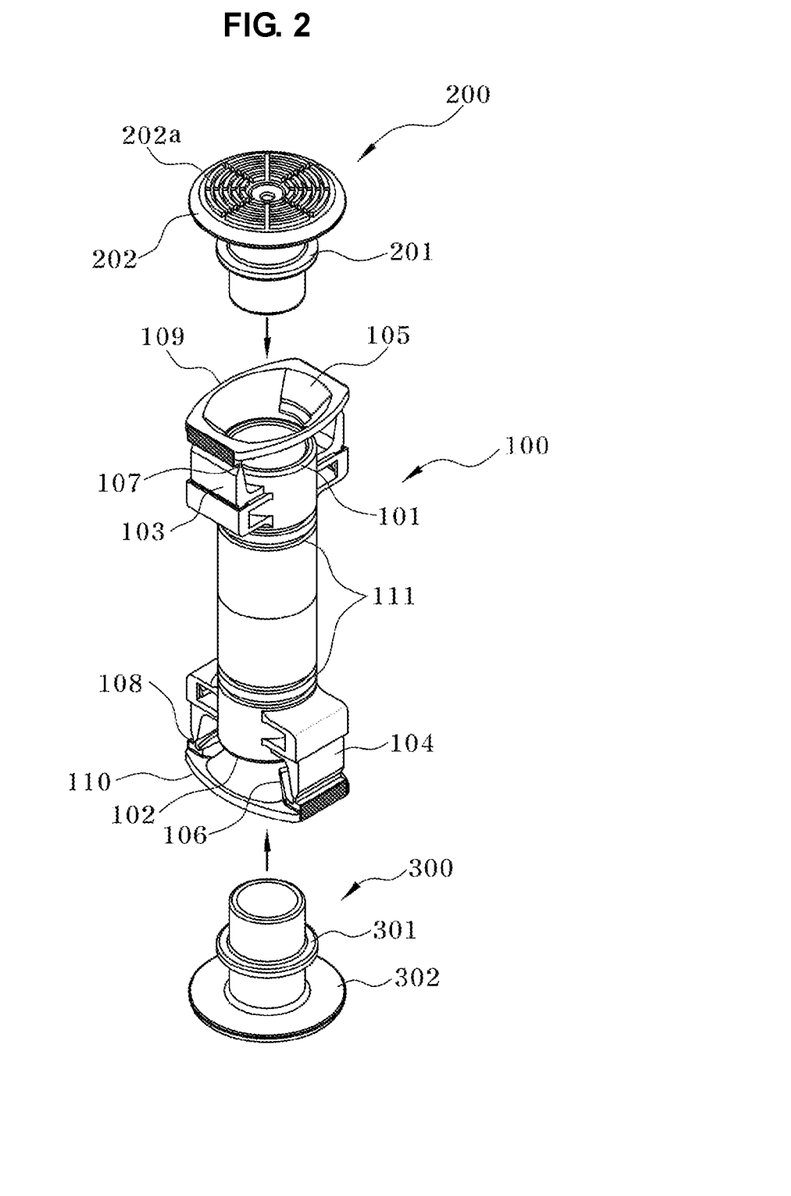
FIG. 2 is an exploded perspective view illustrating a device for reinforcing fuel tank according to one form of the present disclosure.
Figure 3:
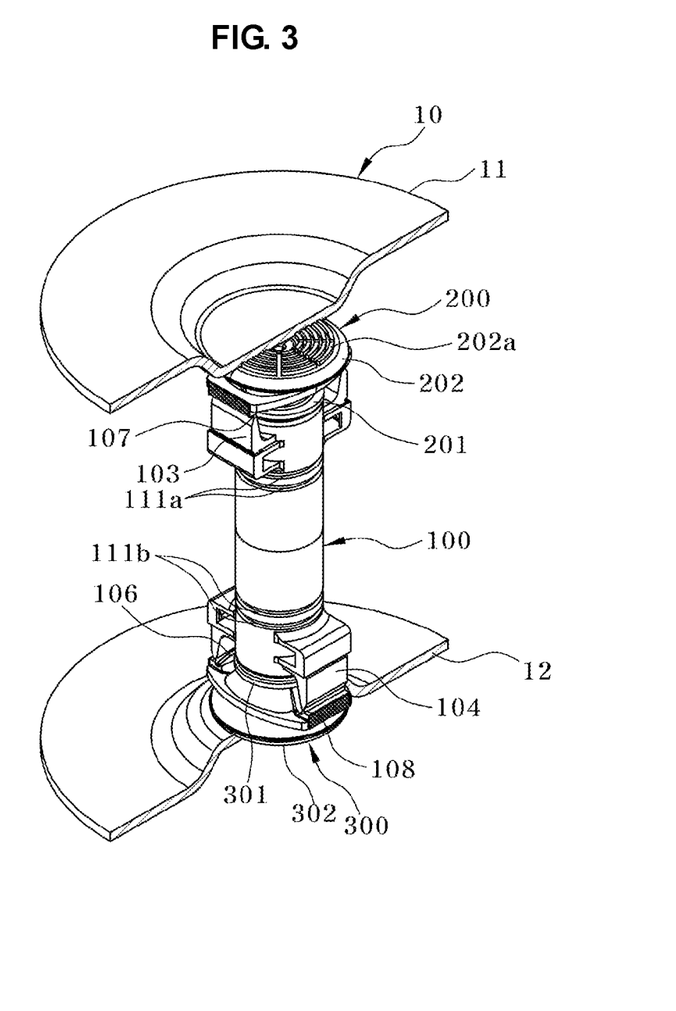
FIG. 3 is an assembled perspective view illustrating the device for reinforcing fuel tank according to one form of the present disclosure.

As illustrated in FIGS. 2 and 3, the reinforcement pillar 100 may have a pipe structure that is circular in cross-section and has a predetermined length, and has an upper opening 101 at the upper portion thereof and a lower opening 102 at the lower portion thereof.

The reinforcement pillar 100 includes upper fastening legs 105 and lower fastening legs 106 for fastening with an upper fusion structure 200 and a lower fusion structure 300. In the reinforcement pillar 100, the upper fastening legs 105 are provided at both positions above the upper opening 101, and the lower fastening legs 106 are provided at both positions beneath the lower opening 102.

The upper fastening legs 105 are supported by upper leg supports 103 and disposed at both positions above the upper opening 101, and the lower fastening legs 106 are supported by lower leg supports 104 and disposed at both positions beneath the lower opening 102.

The upper leg supports 103 protrude from the outer peripheral surface of the upper opening 101 and are disposed beneath the upper fastening legs 105, and the lower leg supports 104 protrude from the outer peripheral surface of the lower opening 102 and are disposed above the upper fastening legs 105.

An upper breaking rib 107 is disposed between each of the upper fastening legs 105 and an associated one of the lower leg supports 103, and a lower breaking rib 108 is disposed between each of the lower fastening legs 106 and an associated one of the lower leg supports 104.

The upper breaking rib 107 is formed integrally with the upper portion of the upper fastening leg 105 and the upper portion of the upper leg support 103 to be connected therebetween. The lower breaking rib 108 is formed integrally with the lower portion of the lower fastening leg 106 and the lower portion of the lower leg support 104 to be connected therebetween.

The upper breaking rib 107 is a portion broken when an excessive tensile force, which is equal to or more than a predetermined threshold tensile force value, is applied to the upper fastening leg 105 through an upper coupling protrusion 201 of the upper fusion structure 200. The lower breaking rib 108 is a portion broken when an excessive tensile force, which is equal to or more than a predetermined threshold tensile force value, is applied to the lower fastening leg 106 through a lower coupling protrusion 301 of the lower fusion structure 300. The tensile force, which is equal to or more than the predetermined threshold tensile force value, may be applied to the upper or lower fastening leg 105 or 106 when a large impact, such as in the event of vehicle collision, is applied to a fuel tank 10.

The upper breaking rib 107 is formed to be thinner than the upper leg support 103 and the upper fastening leg 105, and the lower breaking rib 108 is formed to be thinner than the lower leg support 104 and the lower fastening leg 106. Each of the upper and lower breaking ribs 107 and 108 may have a rib shape that is thinner than the wall of the reinforcement pillar 100.

When an excessive tensile force is applied to the reinforcing pillar 100 through the upper and lower fusion structures 200 and 300, the upper and lower breaking ribs 107 and 108 are broken while the upper and lower fastening legs 105 and 106 support the tensile force.

In order to induce the breakage of the upper and lower breaking ribs 107 and 108 according to the direction in which an impact is applied thereto in the event of vehicle collision, the upper fastening legs 105 may be disposed in the left and right directions of the vehicle in the state in which they are provided at both positions above the upper opening 101, and the lower fastening legs 106 may be disposed in the forward and rearward directions of the vehicle in the state in which they are provided at both positions beneath the lower opening 102.

That is, the upper fastening legs 105 provided at both positions above the upper opening 101 may be disposed in the left and right directions of the vehicle, and the lower fastening legs 106 provided at both positions beneath the lower opening 102 may be disposed in the forward and rearward directions of the vehicle. Thus, the arrangement direction of the upper fastening legs 105 and the arrangement direction of the lower fastening legs 106 may be perpendicular to each other.

Figure 4:
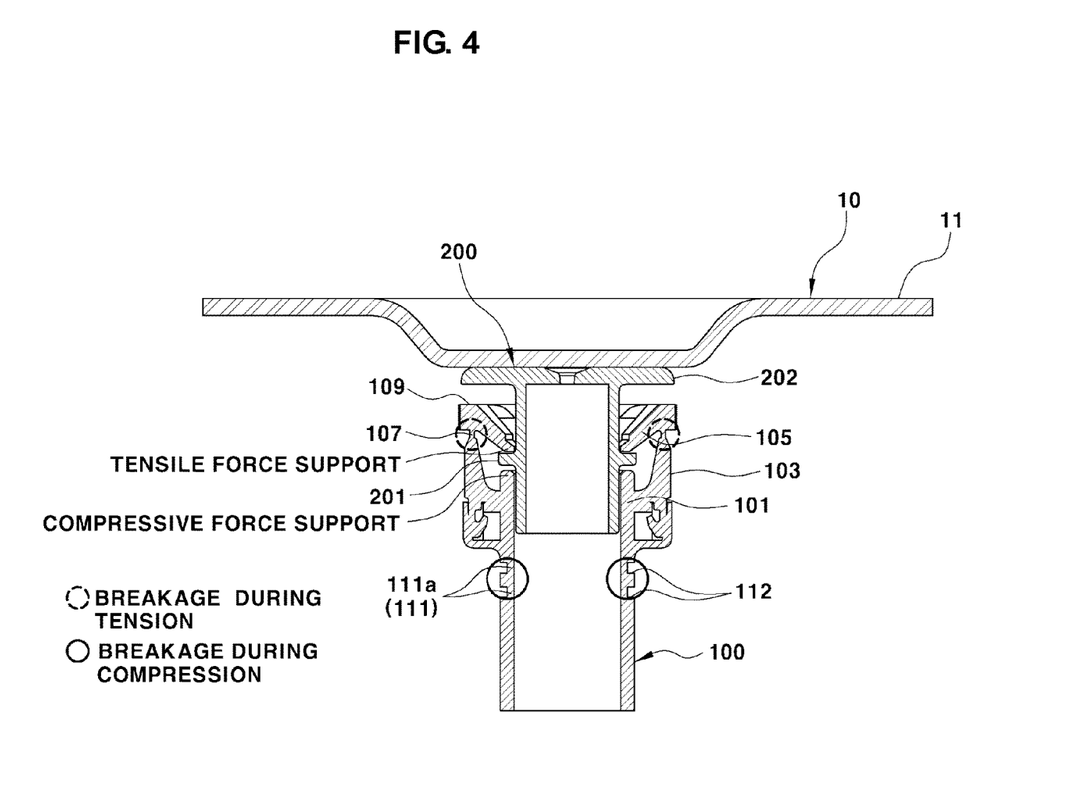
FIG. 4 is an upper cross-sectional view illustrating the device for reinforcing fuel tank in one form the present disclosure.

Referring to FIG. 4, each of the upper fastening legs 105 is inclined diagonally above the upper opening 101. Thus, the upper portion of the upper fastening leg 105 is positioned above the associated upper leg support 103, and the lower portion of the upper fastening leg 105 is positioned at a predetermined distance above the upper opening 101.

Figure 5:
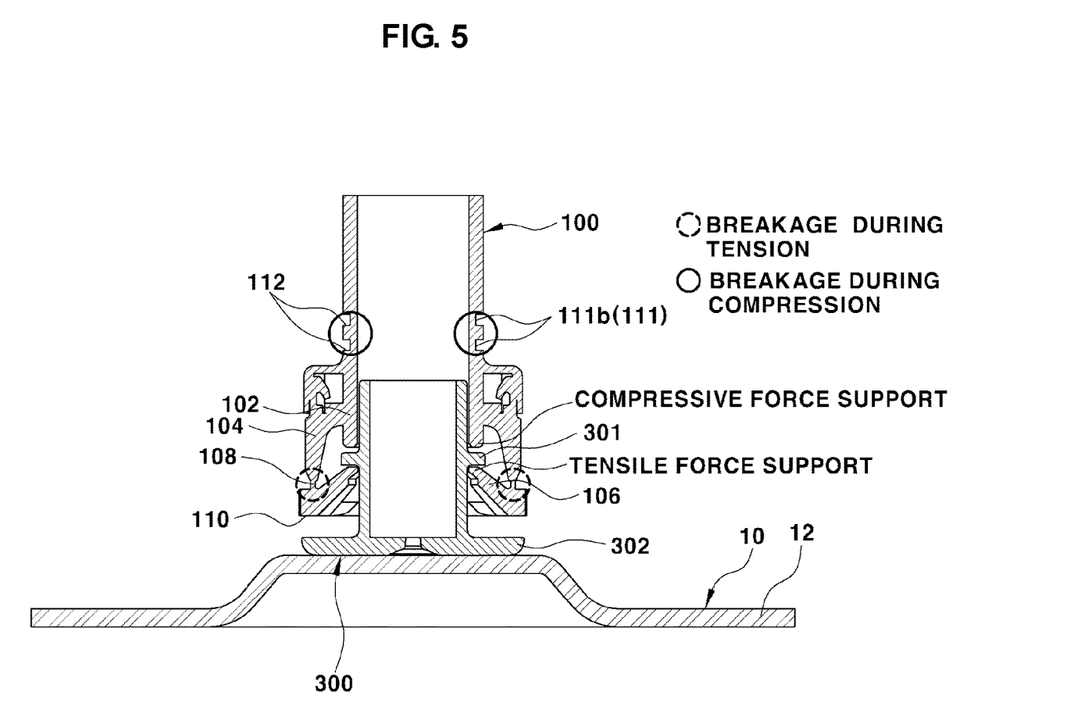
FIG. 5 is a lower cross-sectional view illustrating the device for reinforcing fuel tank in one form of the present disclosure.

Referring to FIG. 5, each of the lower fastening legs 106 is inclined diagonally beneath the lower opening 102. Thus, the lower portion of the lower fastening leg 106 is positioned beneath the associated lower leg support 104, and the upper portion of the lower fastening leg 106 is positioned at a predetermined distance beneath the lower opening 102.

The upper fastening legs 105 may be integrally interconnected by an upper support rib 109 in the state in which they are disposed at both positions above the upper opening 101. The upper support rib 109 may have a ring shape, and the upper fastening legs 105 may be integrally formed at both sides on the lower surface of the ring-shaped upper support rib 109.

The lower fastening legs 106 may be integrally interconnected by a lower support rib 110 in the state in which they are disposed at both positions beneath the lower opening 102. The lower support rib 110 may have a ring shape, and the lower fastening legs 106 may be integrally formed at both sides on the upper surface of the ring-shaped lower support rib 110.

Figure 7:
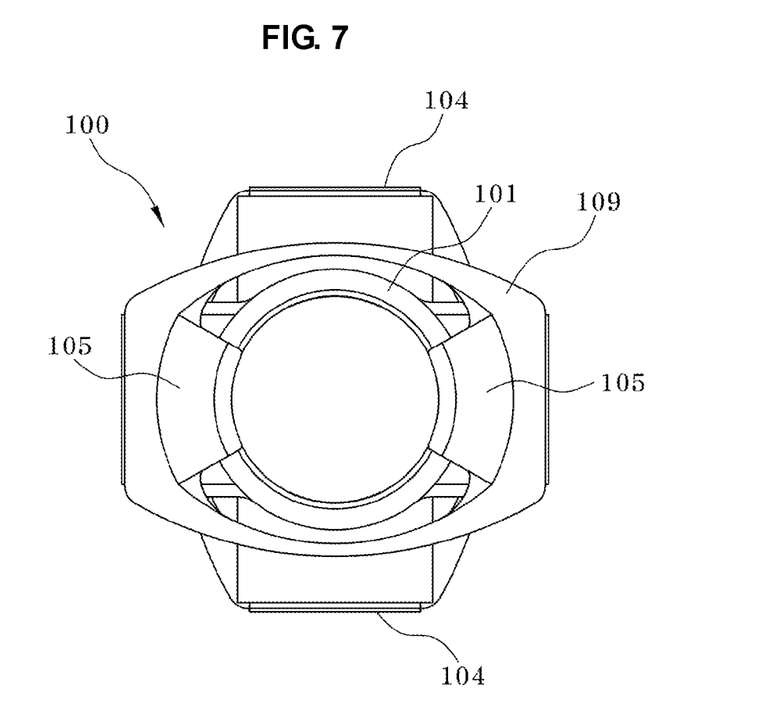
FIG. 7 is a bottom perspective view illustrating a lower structure of the reinforcement pillar according to one form of the present disclosure.
Figure 8A:
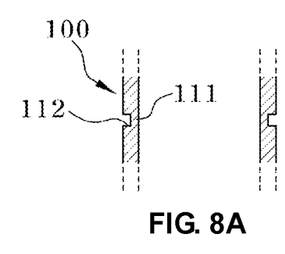
FIGS. 8A-8G are partial views respectively illustrating grooves of the reinforcement pillar according to some forms of the present disclosure.
Figure 8B:
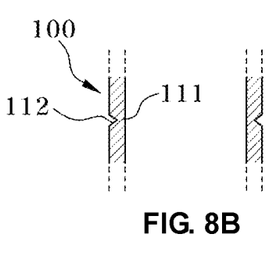
Figure 8C:
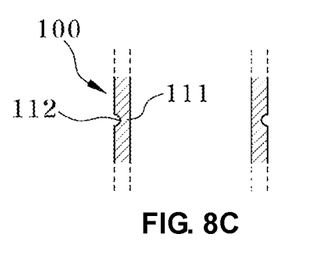
Figure 8D:
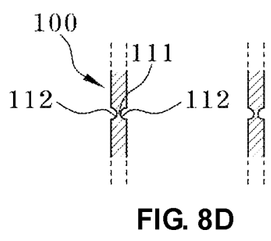
Figure 8E:
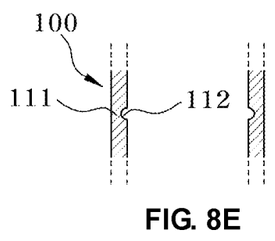
Figure 8F:
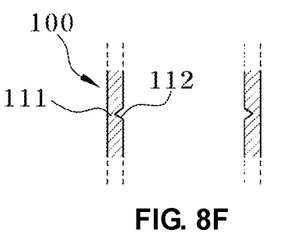
Figure 8G:
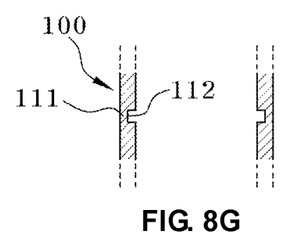

Referring to FIGS. 2 and 7, the upper support rib 109 may extend in an elliptical shape for smoother elastic deformation and normal behavior (operation) of the upper fastening legs 105 when the reinforcement pillar 100 and the upper fusion structure 200 are assembled to each other. In this exemplary form, the pair of upper fastening legs 105 are disposed at both positions above the upper opening 101 in the major-axis direction of the upper support rib 109.

Figure 6:
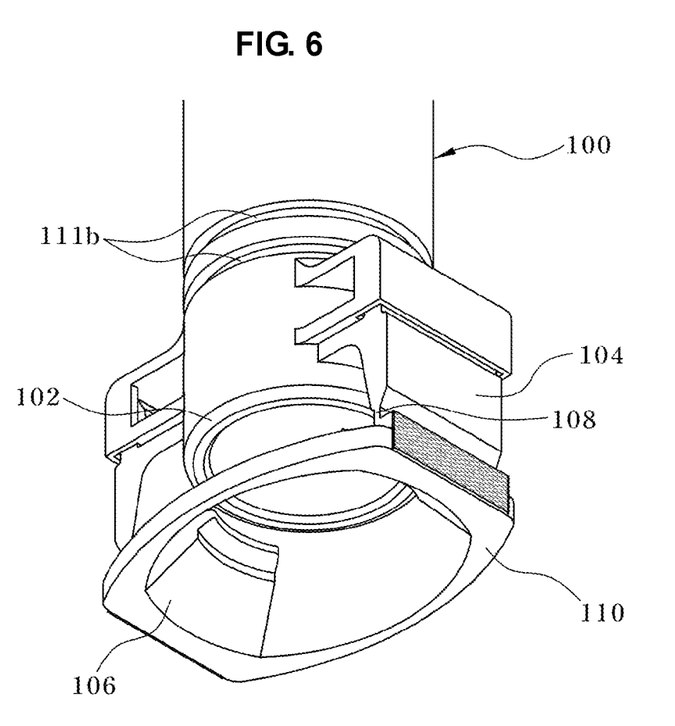
FIG. 6 is a top view illustrating a reinforcement pillar according to one form of the present disclosure.

Likewise, referring to FIG. 6, the lower support rib 110 may extend in an elliptical shape for smoother elastic deformation and normal behavior (operation) of the lower fastening legs 106 when the reinforcement pillar 100 and the lower fusion structure 300 are assembled to each other. In this form, the pair of lower fastening legs 106 are disposed at both positions beneath the lower opening 102 in the major-axis direction of the lower support rib 110.

The pair of upper fastening legs 105 are integrally interconnected and supported by the upper support rib 109, so that they are fastened to the upper coupling protrusion 201 with more stability when the reinforcement pillar 100 and the upper fusion structure 200 are assembled to each other.

Likewise, the pair of lower fastening legs 106 are integrally interconnected and supported by the lower support rib 110, so that they are fastened to the lower coupling protrusion 301 with more stability when the reinforcement pillar 100 and the lower fusion structure 300 are assembled to each other.

As illustrated in FIG. 4, the upper fusion structure 200 may have a pipe structure that is circular in cross-section and has a predetermined length, and has the upper coupling protrusion 201 protruding from the outer peripheral surface thereof. The upper coupling protrusion 201 may extend in the circumferential direction of the upper opening 101.

In the state in which the lower portion of the upper fusion structure 200 is inserted into the upper opening 101 and the upper coupling protrusion 201 is latched and fastened to the lower portions of the upper fastening legs 105, the upper surface of the upper fusion structure 200 is fused and fixed to an inner surface of an upper plate 11 of the fuel tank 10.

When the lower portion of the upper fusion structure 200 is inserted into the upper opening 101, the upper coupling protrusion 201 elastically deforms the upper fastening legs 105 while pushing the lower portions of the upper fastening legs 105 out of the reinforcement pillar 100. When the upper coupling protrusion 201 passes through the upper fastening legs 105, the lower portions of the upper fastening legs 105 move above the upper end of the upper fastening protrusion 201 while the upper fastening legs 105 are restored to their original shapes, so that the upper fastening legs 105 are returned back to a position above the upper opening 101.

When the upper fusion structure 200 is completely assembled to the reinforcement pillar 100, the upper coupling protrusion 201 is inserted and latched between the lower portions of the upper fastening legs 105 and the upper end of the upper opening 101.

For reference, the lower fusion structure 300 may have the same shape and structure as the upper fusion structure 200.

The lower fusion structure 300 may have a pipe structure that is circular in cross-section and has a predetermined length, and has the lower coupling protrusion 301 protruding from the outer peripheral surface thereof. The lower coupling protrusion 301 may extend in the circumferential direction of the lower opening 102.

In the state in which the upper portion of the lower fusion structure 300 is inserted into the lower opening 102 and the lower coupling protrusion 301 is latched and fastened to the upper portions of the lower fastening legs 106, the lower surface of the lower fusion structure 300 is fused and fixed to an inner surface of a lower plate 12 of the fuel tank 10.

When the upper portion of the lower fusion structure 300 is inserted into the lower opening 102, the lower coupling protrusion 301 elastically deforms the lower fastening legs 106 while pushing the upper portions of the lower fastening legs 106 out of the reinforcement pillar 100. When the lower coupling protrusion 301 passes through the lower fastening legs 106, the upper portions of the lower fastening legs 106 move beneath the lower end of the lower fastening protrusion 301 while the lower fastening legs 106 are restored to their original shapes, so that the lower fastening legs 106 are returned back to a position beneath the lower opening 102.

When the lower fusion structure 300 is completely assembled to the reinforcement pillar 100, the lower coupling protrusion 301 is inserted and latched between the upper portions of the lower fastening legs 106 and the lower end of the lower opening 102.

The upper fusion structure 200 is coupled to the upper opening 101 by the upper coupling protrusion 201 engaged with the upper fastening legs 105 to bear and support the tensile force and compressive force, which are less than a threshold value, transmitted through the fuel tank 10. The lower fusion structure 300 is coupled to the lower opening 102 by the lower coupling protrusion 301 engaged with the lower fastening legs 106 to bear and support the tensile force and compressive force, which are less than a threshold value (e.g., threshold tensile force value, threshold compressive force value), transmitted through the fuel tank 10.

Specifically, the upper fusion structure 200 supports the tensile force by latching the upper coupling protrusion 201 to the lower portions of the upper fastening legs 105, and the upper coupling protrusion 201 is latched to the upper end of the upper opening 101 to support the compressive force. The lower fusion structure 300 supports the tensile force by latching the lower coupling protrusion 301 to the upper portions of the lower fastening legs 106, and the lower coupling protrusion 301 is latched to the lower end of the lower opening 102 to support the compressive force.

The upper fusion structure 200 may be integrally provided, at the upper end thereof, with an upper fusion plate 202 having plurality of fusion protrusions 202a for fusion with the upper plate 11 of the fuel tank 10.

Likewise, the lower fusion structure 300 may be integrally provided, at the lower end thereof, with a lower fusion plate 302 having plurality of fusion protrusions 302a for fusion with the lower plate 12 of the fuel tank 10.

The fusion protrusions 202a and 302a enable fusion strength to be improved between the upper and lower fusion structures 200 and 300 and the fuel tank 10. Each of the fusion protrusions 202a and 302a may have various shapes such as a dot shape, a straight shape, and an arc shape.

The upper fusion plate 202 may be fused to the inner surface of the upper plate 11 of the fuel tank 10 by thermal fusion, ultrasonic fusion, or the like after the fusion protrusions 202a formed on the upper surface of the upper fusion plate 202 to the inner surface of the upper plate 11.

Likewise, the lower fusion plate 302 may be fused to the inner surface of the lower plate 12 of the fuel tank 10 by thermal fusion, ultrasonic fusion, or the like after the fusion protrusions 302a formed on the lower surface of the lower fusion plate 302 to the inner surface of the lower plate 12.

The upper and lower fusion structures 200 and 300 including the respective upper and lower fusion plates 202 and 302 may be made of the same plastic material, such as high density polyethylene (HDPE), as the fuel tank 10.

As such, the upper and lower fusion structures 200 and 300 are fused to the upper and lower plates 11 and 12 of the fuel tank 10 to be integrated with each other.

Thus, even if the external force applied to the fuel tank 10 acts on the upper and lower fusion structures 200 and 300 as a compressive force, the upper coupling protrusion 201 is supported by the upper end of the upper opening 101 and the lower coupling protrusion 301 is supported by the lower end of the lower opening 102. In addition, even if the external force applied to the fuel tank 10 acts on the upper and lower fusion structures 200 and 300 as a tensile force, the upper coupling protrusion 201 is supported by the lower portions of the upper fastening legs 105 and the lower coupling protrusion 301 is supported by the upper portions of the lower fastening legs 106, with the consequence that the reinforcement pillar 100 bears the load less than the threshold value (see FIGS. 4 and 5).

As such, the reinforcement pillar 100 serves to support the stiffness of the fuel tank 10 for preventing the deformation of the fuel tank 10 even if an external force is applied to the fuel tank 10.

Meanwhile, the reinforcing pillar 100 may be made of a material such as polyoxymethylen (POM). As illustrated in FIGS. 2 to 5, at least one breakable part 111 is provided between the upper leg supports 103 and the lower leg supports 104.

When a plurality of breakable parts 111 are formed in the reinforcement pillar 100, the breakable parts 111 may be arranged vertically.

When a large impact, such as in the event of vehicle collision, is transmitted to the reinforcement pillar 100 through the fuel tank 10, each of the breakable parts 111 may be broken by the excessive compressive force (compressive load) acting on the reinforcement pillar 100.

The breakable part 111 may be a portion formed to reduce the radial thickness of the reinforcement pillar 100 in order to induce the breakage of the reinforcement pillar 100 by a compressive load that is equal to or more than a threshold compressive load value. The breakable part 111 may be a portion in which the thickness of the reinforcement pillar 100 is reduced by a groove 112 formed in the reinforcement pillar 100.

The breakable part 111 may extend in the circumferential direction of the reinforcement pillar 100. The breakable part 111 may be divided into, on the basis of the vertical center of the reinforcement pillar 100, an upper breakable part 111a disposed at the upper portion of the reinforcement pillar 100 and a lower breakable part 111b disposed at the lower portion of the reinforcement pillar 100.

The upper breakable part 111a may be disposed beneath the upper leg supports 103, and the lower breakable part 111b may be disposed above the lower leg supports 104.

When a compressive force, which is equal to or more than a threshold compressive force value, acts on the reinforcement pillar 100, the upper and lower breakable parts 111a and 111b having a relatively thin thickness are broken by the stress concentrated thereon.

As illustrated in FIGS. 8A-8G, the groove 112 may be recessed on the inner or outer surface of the reinforcement pillar 100. Alternatively, the groove 112 may be formed on both the inner and outer surfaces of the reinforcement pillar 100. The groove 112 may have any shape as long as it is able to reduce the cross-sectional area of the breakable part 111. For example, the groove 112 may have a notch, a semicircle, a square, or the like in cross-section.

When a large impact (i.e., an impact greater than a threshold impact value), such as in the event of vehicle collision, is applied to the enclosed fuel tank 10, the impact may be transmitted to the reinforcement pillar 100 while the fuel tank 10 is deformed. When the impact due to the deformation of the fuel tank 10 is transmitted to the upper or lower fusion structure 200 or 300 fused integrally with the fuel tank 10, the upper and lower fusion structures 200 and 300 may be decoupled from each other while the upper and lower breaking ribs 107 and 108 are broken by the impact, or the vertical standing state of the reinforcement pillar 100 may be collapsed while the upper or lower breakable part 111a or 111b is broken, with the consequence that the upper and lower fusion structures 200 and 300 may be kept fused to the respective upper and lower plates 11 and 12 of the fuel tank 10.

In other words, the device for reinforcing fuel tank according to the present disclosure serves to prevent the deformation of the fuel tank 10 even if the internal pressure of the fuel tank 10 is increased, and to maintain the fusion between the fusion structures 200 and 300 and the fuel tank 10 by breaking the fastened portions between the reinforcement pillar 100 and the fusion structures 200 and 300a or breaking the reinforcement pillar 100 when a large impact, such as in the event of vehicle collision, is applied to the fuel tank 10, thereby easily preventing a leakage of oil due to the rupture of the fused portion of the fuel tank in the related art.

In accordance with the exemplary forms, the present disclosure provides the following effects.

First, it is possible to maintain the stiffness of the reinforcement pillar in the state in which the fuel tank is under positive pressure and the engine negative pressure acts thereon, thereby preventing the deformation of the fuel tank.

Second, even if an impact (rupture pressure), such as in the event of vehicle collision, is applied to the fuel tank and the reinforcement pillar, it is possible to absorb the impact by the reinforcement pillar while inducing the decoupling of the reinforcement pillar from the upper and lower plates of the fuel tank, and at the same time, to keep the upper and lower fusion structures of the reinforcement pillar fused to the upper and lower plates of the fuel tank.

Third, since the upper and lower fusion structures of the reinforcement pillar are kept fused to the upper and lower plates of the fuel tank in the condition that the (rupture pressure), such as in the event of vehicle collision, is applied thereto, it is possible to easily prevent the leakage of oil due to the rupture in the fused portion of the fuel tank.

The disclosure has been described in detail with reference to exemplary forms thereof. However, it will be appreciated by those skilled in the art that changes may be made in these forms without departing from the principles and spirit of the disclosure.

What is claimed is:

1. A device for reinforcing vehicle fuel tank, comprising:
a reinforcement pillar including:
an upper portion forming an upper opening,
a lower portion forming a lower opening,
upper fastening legs provided above the upper opening, and
lower fastening legs provided beneath the lower opening;
an upper fusion structure having an upper coupling protrusion on an outer peripheral surface thereof, wherein an upper surface of the upper fusion structure is fused to an inner surface of an upper plate of a fuel tank in a state in which a lower portion of the upper fusion structure is inserted into the upper opening and the upper coupling protrusion is latched and fastened to the upper fastening legs;
a lower fusion structure having a lower coupling protrusion on an outer peripheral surface thereof, wherein a lower surface of the lower fusion structure is fused to an inner surface of a lower plate of the fuel tank in a state in which an upper portion of the lower fusion structure is inserted into the lower opening and the lower coupling protrusion is latched and fastened to the lower fastening legs; and
at least one breakable part formed in the reinforcement pillar to induce breakage of the reinforcement pillar when an impact is applied to the reinforcement pillar and the impact is equal to or greater than a threshold impact value,
wherein the reinforcement pillar further includes at least one of:
upper leg supports formed on an outer peripheral surface of the upper opening to support the upper fastening legs, or
lower leg supports formed on an outer peripheral surface of the lower opening to support the lower fastening legs.

2. The device of claim 1, wherein the reinforcement pillar further includes: both of the upper leg supports and the lower leg supports to support the upper and lower fastening legs, respectively.

3. The device of claim 2, wherein:
upper breaking ribs are formed integrally with the upper fastening legs and the upper leg supports and disposed between the upper fastening legs and the upper leg supports, and
the upper breaking ribs are broken by a tensile force applied through the upper coupling protrusion when the tensile force is equal to or greater than a threshold tensile force value.

4. The device of claim 3, wherein:
the upper fastening legs are inclined diagonally above the upper opening,
upper portions of the upper fastening legs are connected to the upper leg supports through the upper breaking ribs,
lower portions of the upper fastening legs are positioned at a predetermined distance above an upper end of the upper opening, and
the upper coupling protrusion is inserted and positioned between the lower portions of the upper fastening legs and the upper end of the upper opening.

5. The device of claim 2, wherein the at least one breakable part is provided between the upper leg supports and the lower leg supports, and the at least one breakable part is broken by a compressive force exerted from a vehicle collision and the compressive force is equal to or more than a threshold compressive value.

6. The device of claim 5, wherein the at least one breakable part is a groove formed at a portion where the reinforcement pillar is reduced in radial thickness.

7. The device of claim 6, wherein the groove is recessed on either an inner or outer surface of the reinforcement pillar.

8. The device of claim 6, wherein the groove is recessed on both inner and outer surfaces of the reinforcement pillar.

9. The device of claim 2, wherein lower breaking ribs are formed integrally with the lower fastening legs and the lower leg supports and disposed between the lower fastening legs and the lower leg supports, and the lower breaking ribs are broken by a tensile force applied through the lower coupling protrusion when the tensile force is equal to or greater than a threshold tensile force value.

10. The device of claim 9, wherein:
the lower fastening legs are inclined diagonally beneath the lower opening,
lower portions of the lower fastening legs are connected to the lower leg supports through the lower breaking ribs,
upper portions of the lower fastening legs are positioned at a predetermined distance beneath a lower end of the lower opening, and
the lower coupling protrusion is inserted and positioned between the upper portions of the lower fastening legs and the lower end of the lower opening.

11. The device of claim 1, wherein:
the upper fusion structure is provided, at an upper end thereof, with an upper fusion plate having plurality of fusion protrusions for fusion with the upper plate of the fuel tank, and
the lower fusion structure is provided, at a lower end thereof, with a lower fusion plate having a plurality of fusion protrusions for fusion with the lower plate of the fuel tank.

12. The device of claim 1, wherein the upper coupling protrusion extends in a circumferential direction of the upper opening, and the lower coupling protrusion extends in a circumferential direction of the lower opening.

13. A device for reinforcing vehicle fuel tank, comprising:
a reinforcement pillar including:
an upper portion forming an upper opening,
a lower portion forming a lower opening,
upper fastening legs provided above the upper opening, and
lower fastening legs provided beneath the lower opening;
an upper fusion structure having an upper coupling protrusion on an outer peripheral surface thereof, wherein an upper surface of the upper fusion structure is fused to an inner surface of an upper plate of a fuel tank in a state in which a lower portion of the upper fusion structure is inserted into the upper opening and the upper coupling protrusion is latched and fastened to the upper fastening legs;
a lower fusion structure having a lower coupling protrusion on an outer peripheral surface thereof, wherein a lower surface of the lower fusion structure is fused to an inner surface of a lower plate of the fuel tank in a state in which an upper portion of the lower fusion structure is inserted into the lower opening and the lower coupling protrusion is latched and fastened to the lower fastening legs; and
at least one breakable part formed in the reinforcement pillar to induce breakage of the reinforcement pillar when an impact is applied to the reinforcement pillar and the impact is equal to or greater than a threshold impact value,
wherein:
the upper fastening legs disposed above the upper opening are integrally formed on a lower surface of an upper support rib having a ring shape, and
the lower fastening legs disposed beneath the lower opening are integrally formed on an upper surface of a lower support rib having a ring shape.

14. The device of claim 13, wherein the upper and lower support ribs extend in an elliptical shape.

15. The device of claim 13, wherein the reinforcement pillar further includes at least one of:
upper leg supports formed on an outer peripheral surface of the upper opening to support the upper fastening legs, or
lower leg supports formed on an outer peripheral surface of the lower opening to support the lower fastening legs.

16. The device of claim 15, wherein the reinforcement pillar includes both of the upper leg supports formed on the outer peripheral surface of the upper opening to support the upper fastening legs and the lower leg supports formed on the outer peripheral surface of the lower opening to support the lower fastening legs.

17. The device of claim 15, wherein:
upper breaking ribs are formed integrally with the upper fastening legs and the upper leg supports and disposed between the upper fastening legs and the upper leg supports, and
the upper breaking ribs are broken by a tensile force applied through the upper coupling protrusion when the tensile force is equal to or greater than a threshold tensile force value.

18. The device of claim 15, wherein lower breaking ribs are formed integrally with the lower fastening legs and the lower leg supports and disposed between the lower fastening legs and the lower leg supports, and the lower breaking ribs are broken by a tensile force applied through the lower coupling protrusion when the tensile force is equal to or greater than a threshold tensile force value.

19. The device of claim 13, wherein:
the upper fusion structure is provided, at an upper end thereof, with an upper fusion plate having plurality of fusion protrusions for fusion with the upper plate of the fuel tank, and
the lower fusion structure is provided, at a lower end thereof, with a lower fusion plate having a plurality of fusion protrusions for fusion with the lower plate of the fuel tank.

20. The device of claim 13, wherein the upper coupling protrusion extends in a circumferential direction of the upper opening, and the lower coupling protrusion extends in a circumferential direction of the lower opening.

* * * * *